United States Patent
Wang et al.

(10) Patent No.: US 10,754,184 B2
(45) Date of Patent: Aug. 25, 2020

(54) DISPLAY DEVICE AND HEAT EXCHANGER THEREOF

(71) Applicant: DynaScan Technology Corp., Taoyuan County (TW)

(72) Inventors: Tsun-I Wang, Taoyuan County (TW); Ching-Chun Wu, Taoyuan County (TW); Chia-Liang Yang, Taoyuan County (TW)

(73) Assignee: DYNASCAN TECHNOLOGY CORP., Taoyuan County (TW)

( * ) Notice: Subject to any disclaimer, the term of this patent is extended or adjusted under 35 U.S.C. 154(b) by 0 days.

(21) Appl. No.: 16/363,148

(22) Filed: Mar. 25, 2019

(65) Prior Publication Data
US 2020/0012143 A1 Jan. 9, 2020

(30) Foreign Application Priority Data
Jul. 4, 2018 (TW) .............................. 107123025 A (51) Int. Cl.
*G02F 1/1333* (2006.01)
*G02F 1/13357* (2006.01)

(52) U.S. Cl.
CPC .. *G02F 1/133385* (2013.01); *G02F 1/133602* (2013.01); *G02F 2001/133628* (2013.01)

(58) Field of Classification Search
None
See application file for complete search history.

(56) References Cited

U.S. PATENT DOCUMENTS

| | | | | |
|---|---|---|---|---|
| 2008/0285290 A1* | 11/2008 | Ohashi | ............... | G02B 6/0085 362/373 |
| 2010/0188596 A1* | 7/2010 | Juan | ............... | G02F 1/133308 349/58 |
| 2011/0001898 A1* | 1/2011 | Mikubo | ............ | G02F 1/133385 349/58 |
| 2014/0111758 A1* | 4/2014 | Dunn | ............... | H05K 7/20136 349/161 |
| 2014/0268657 A1* | 9/2014 | Dunn | ............... | G02F 1/133606 362/97.2 |
| 2014/0345834 A1* | 11/2014 | Dunn | ............... | G02F 1/133385 165/120 |
| 2018/0088368 A1* | 3/2018 | Notoshi | .................. | F21V 29/65 |
| 2018/0259806 A1* | 9/2018 | Oh | ..................... | H05K 7/20972 |
| 2019/0182981 A1* | 6/2019 | Huang | .................. | G02F 1/1336 |
| 2020/0118472 A1* | 4/2020 | Wang | ............... | G02F 1/133385 |

* cited by examiner

*Primary Examiner* — Ryan Crockett
(74) *Attorney, Agent, or Firm* — Locke Lord LLP; Tim Tingkang Xia, Esq.

(57) ABSTRACT

A heat exchanger for an electronic device including a light module is provided. The heat exchanger includes an internal heat exchange portion configured to be adjacently attached to the light module. The internal heat exchange portion has at least one internal heat dissipation channel. The internal heat dissipation channel is connected with a device space of the electronic device. A high temperature gas flow generated by the light module is enabled to pass through the device space and the internal heat dissipation channel.

17 Claims, 10 Drawing Sheets

DISPLAY DEVICE AND HEAT EXCHANGER THEREOF

CROSS-REFERENCE TO RELATED APPLICATIONS

This non-provisional application claims priority under 35 U.S.C. § 119(a) on Patent Application No(s). 107123025 filed in Taiwan, R.O.C. on Jul. 4, 2018, the entire contents of which are hereby incorporated by reference.

BACKGROUND

1. Technical Field

The present disclosure provides a heat exchanger and a display device, more particularly to a heat exchanger with high heat dissipation efficiency and a display device using the heat exchanger for heat dissipation.

2. Related Art

With the development of technology, the demand for display devices is gradually increasing. In recent years, different types of display devices have been used, such as liquid crystal displays (LCDs), plasma display panels (PDPs), organic light emitting display (OLED) and the like. The light source module inside the display device is mainly to provide illumination of the display device.

Taking a liquid crystal display as an example, it generally includes a liquid crystal cell, a backlight module and a casing. A light source of the backlight module could be a line source or a point source, and light emitted by the source is converted into a high brightness and uniform surface light when passing through a light guide plate. Heat generated by the light source of the backlight module is transferred toward the casing of the liquid crystal display and then accumulated inside the casing.

SUMMARY

According to one aspect of the disclosure, a heat exchanger for an electronic device including a light module is provided. The heat exchanger includes an internal heat exchange portion configured to be adjacently attached to the light module. The internal heat exchange portion has at least one internal heat dissipation channel. The internal heat dissipation channel is connected with a device space of the electronic device. A high temperature gas flow generated by the light module is enabled to pass through the device space and the internal heat dissipation channel.

In one embodiment of the disclosure, the heat exchanger further includes an external heat exchange portion in thermal contact with the internal heat exchange portion. The external heat exchange portion has an external heat dissipation structure non-connected with the internal heat dissipation channel. An ambient air flow is enabled to pass through the external heat dissipation structure.

In one embodiment of the disclosure, the external heat dissipation structure has at least one external heat dissipation channel, and the ambient air flow is enabled to pass through the external heat dissipation channel.

In one embodiment of the disclosure, the external heat dissipation structure includes a plurality of heat sink fins, and the ambient air flow is enabled to pass through the heat sink fins.

In one embodiment of the disclosure, the internal heat exchange portion has an inner side surface facing toward the light module, and the external heat exchange portion has an outer side surface opposite to the inner side surface. The internal heat dissipation channel and the at least one external heat dissipation channel are located between the inner side surface and the outer side surface.

In one embodiment of the disclosure, both the numbers of internal heat dissipation channel and external heat dissipation channel are multiple.

In one embodiment of the disclosure, a sum of cross sectional areas of the internal heat dissipation channels and the external heat dissipation channels is 35% to 70% of a sum of cross sectional areas of the internal heat exchange portion and the external heat exchange portion.

In one embodiment of the disclosure, the heat exchanger includes a plurality of heat sink fins disposed in at least one of the internal heat dissipation channel and the external heat dissipation channel.

According to another aspect of the disclosure, a display device includes a display assembly and a heat exchanger. The heat exchanger includes an internal heat exchange portion and an external heat exchange portion. The internal heat exchange portion is configured to be adjacently attached to the display assembly. The internal heat exchange portion has at least one internal heat dissipation channel. The internal heat dissipation channel is connected with an assembly space of the display assembly. A high temperature gas flow generated by the display assembly is enabled to pass through the assembly space and the internal heat dissipation channel. The external heat exchange portion is in thermal contact with the internal heat exchange portion. The external heat exchange portion has an external heat dissipation structure non-connected with the internal heat dissipation channel. An ambient air flow is enabled to pass through the external heat dissipation structure.

In one embodiment of the disclosure, the display device includes a casing and a first flow generator disposed in the casing. The casing includes a display portion and a rear portion opposite to each other. The display assembly includes a display unit and a backlight module. The display unit is exposed to outside by the display portion. The heat exchanger is disposed on the rear portion. The backlight module is adjacently attached to and in thermal contact with the internal heat exchange portion of the heat exchanger. The first flow generator corresponds to the at least one internal heat dissipation channel.

In one embodiment of the disclosure, the display assembly includes a display unit, a backlight module and a chamber. The chamber is located between the display unit and the backlight module, and the chamber has the assembly space.

In one embodiment of the disclosure, the display assembly includes a cover disposed on the casing and a second flow generator disposed on the cover, and the second flow generator corresponds to the external heat dissipation structure.

BRIEF DESCRIPTION OF THE DRAWINGS

The present disclosure will become more understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Please refer to FIG. 1A to FIG. 1D. FIG. 1A through FIG. 1D are schematic views of an electronic device including a light module and a heat exchanger according to an embodiment of the present disclosure. A heat exchanger 320 is able to be adjacently attached to a light module LM of an electronic device ED for improving the heat dissipation of the electronic device ED, and the electronic device ED may be a display device or an illumination device. Under a condition that the electronic device ED is a display device, the light module LM is a backlight module; and under a condition that the electronic device ED is an illumination device, the light module LM is a lighting source.

Further, the heat exchanger 320 includes an internal heat exchange portion 321 and an external heat exchange portion 322.

The internal heat exchange portion 321 is configured to be adjacently attached to a rear surface of the light module LM (that is, a surface far away from a luminous surface), and the internal heat exchange portion 321 has at least one internal heat dissipation channel 3211. The at least one internal heat dissipation channel 3211 is connected with a device space ES of the electronic device ED; that is, a high temperature gas flow HF generated by the electronic device ED is enabled to pass through the device space ES and the at least one internal heat dissipation channel 3211. Moreover, the number of the internal heat dissipation channel 3211 may be one or more than one, and multiple heat sink fins F1 may be disposed in the at least one internal heat dissipation channel 3211.

The external heat exchange portion 322 is in thermal contact with the internal heat exchange portion 321. The external heat exchange portion 322 has an external heat dissipation structure OS non-connected with the at least one internal heat dissipation channel 3211; that is, the gas flow (for example, the high temperature gas flow HF) passing through the at least one heat dissipation channel 3211 does not flow into the external heat dissipation structure OS, and the gas flow (for example, an ambient air flow) passing through the external heat dissipation structure OS does not flow into the at least one internal heat dissipation channel 3211. In one embodiment, the external heat dissipation structure OS has at least one external heat dissipation channel 3221 non-connected with the at least one heat dissipation channel 3211. In another embodiment, the external heat dissipation structure OS has at least one external heat dissipation channel 3221 in which multiple heat sink fins F1 are disposed. In still another embodiment, the external heat dissipation structure OS includes multiple heat sink fins F2.

Various aspects of the heat exchanger 320 are illustrated in the following paragraphs.

Figure 1A:
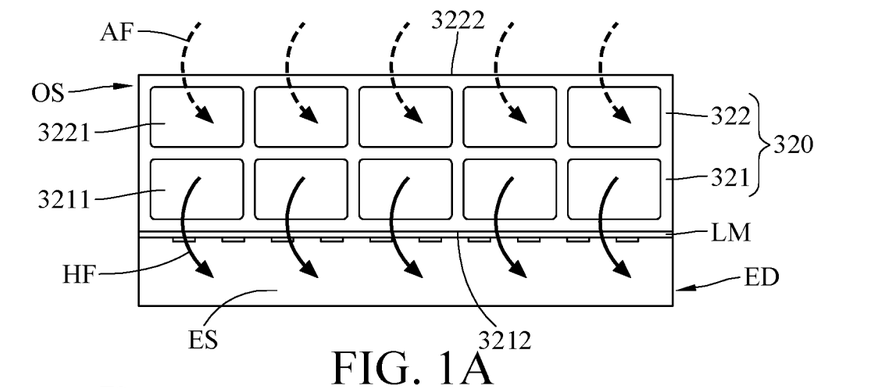
FIG. 1A through FIG. 1D are schematic views of an electronic device including a light module and a heat exchanger according to an embodiment of the present disclosure.

As shown in FIG. 1A, the number of the internal heat dissipation channel 3211 is multiple (take five internal heat dissipation channels as example). The external heat dissipation structure OS has at least one external heat dissipation channel 3221, and the number of the external heat dissipation channel 3221 is five as an exemplary illustration. The internal heat exchange portion 321 has an inner side surface 3212 facing toward the light module LM. The external heat exchange portion 322 has an outer side surface 3222 opposite to the inner side surface 3212. Both the at least one internal heat dissipation channel 3211 and the at least one external heat dissipation channel 3221 are located between the inner side surface 3212 and the outer side surface 3222.

Figure 1B:
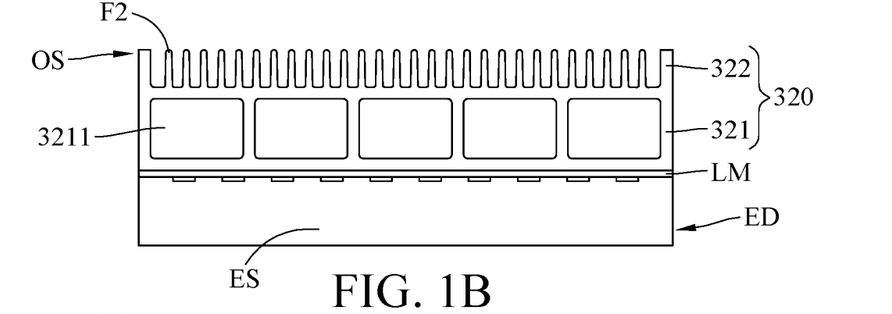

As shown in FIG. 1B, the number of the internal heat dissipation channel 3211 is five as an exemplary illustration. The external heat dissipation structure OS includes multiple heat sink fins F2.

Figure 1C:
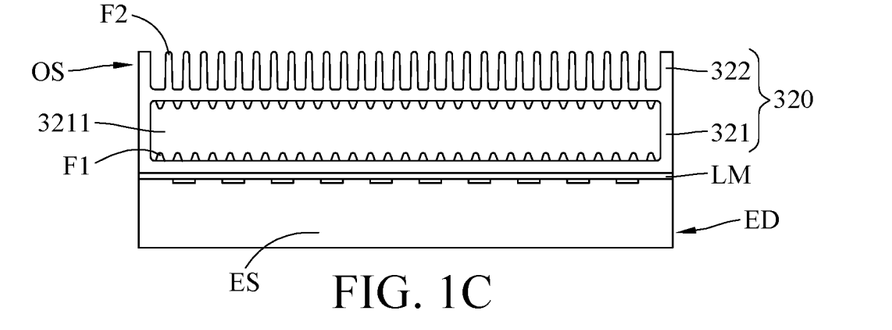

As shown in FIG. 1C, the number of the internal heat dissipation channel 3211 is one as an exemplary illustration. The heat exchanger 320 further includes multiple heat sink fins F1 disposed in the internal heat dissipation channel 3211, and the external heat dissipation structure OS includes multiple heat sink fins F2.

Figure 1D:
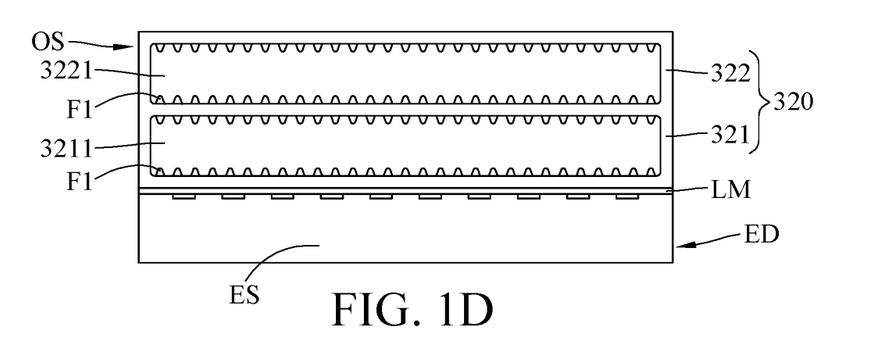

As shown in FIG. 1D, the number of the internal heat dissipation channel 3211 is one as an exemplary illustration. The heat exchanger 320 further includes multiple heat sink fins Fl disposed in the internal heat dissipation channel 3211, and the external heat dissipation structure OS has at least one external heat dissipation channel 3221. In this embodiment, the number of the external heat dissipation channel 3221 is one as an exemplary illustration. The heat exchanger 320 further includes multiple heat sink fins Fl disposed in the external heat dissipation channel 3221.

It is noted that the heat exchangers 320 shown in FIG. 1A through FIG. 1D are exemplary, and the present disclosure is not limited to the configuration of the heat exchangers 320.

In order to describe the heat dissipation mechanism of the heat exchanger 320 more specifically, the heat exchanger 320 is applied to a display device for example. In the following paragraphs, both the number of internal heat dissipation channel 3211 of the internal heat exchange portion 321 and the number of external heat dissipation structure OS of the external heat exchange portion 322 are multiple as exemplary illustration.

Figure 2:
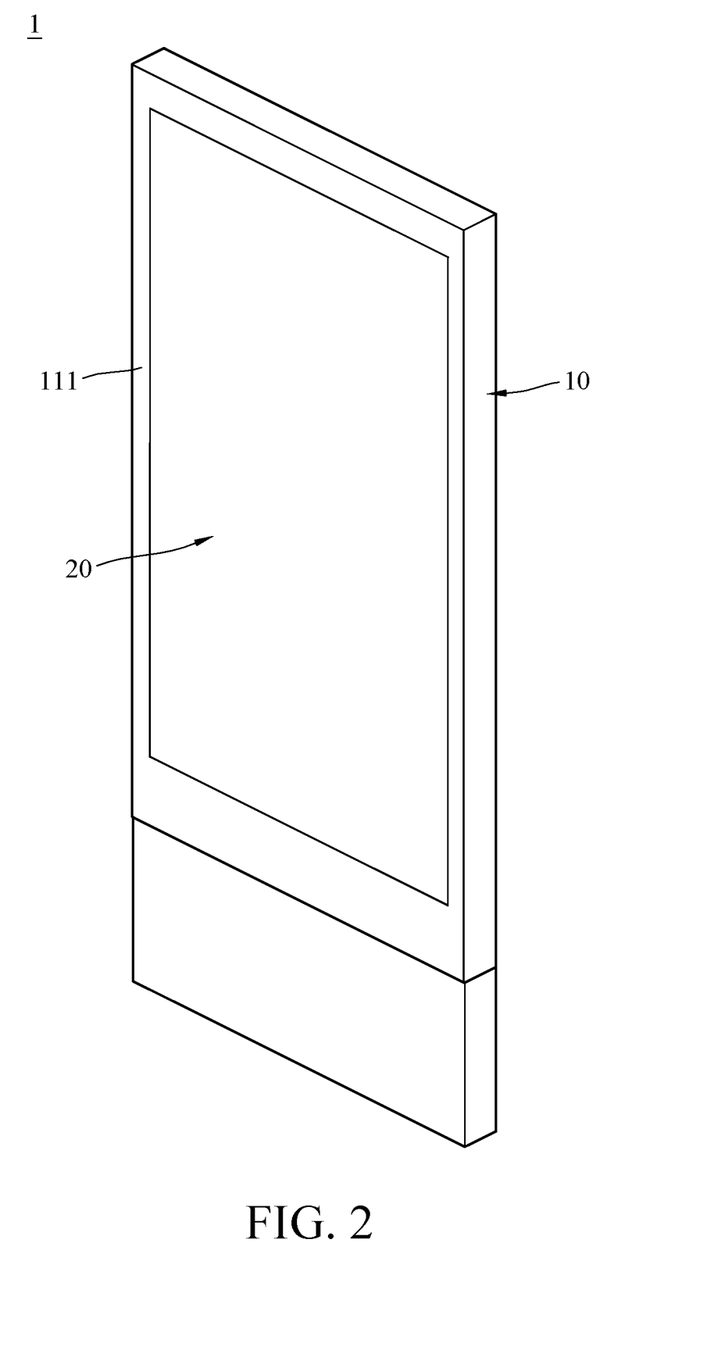
FIG. 2 is a perspective view of a display device according to a first embodiment of the present disclosure.
Figure 3:
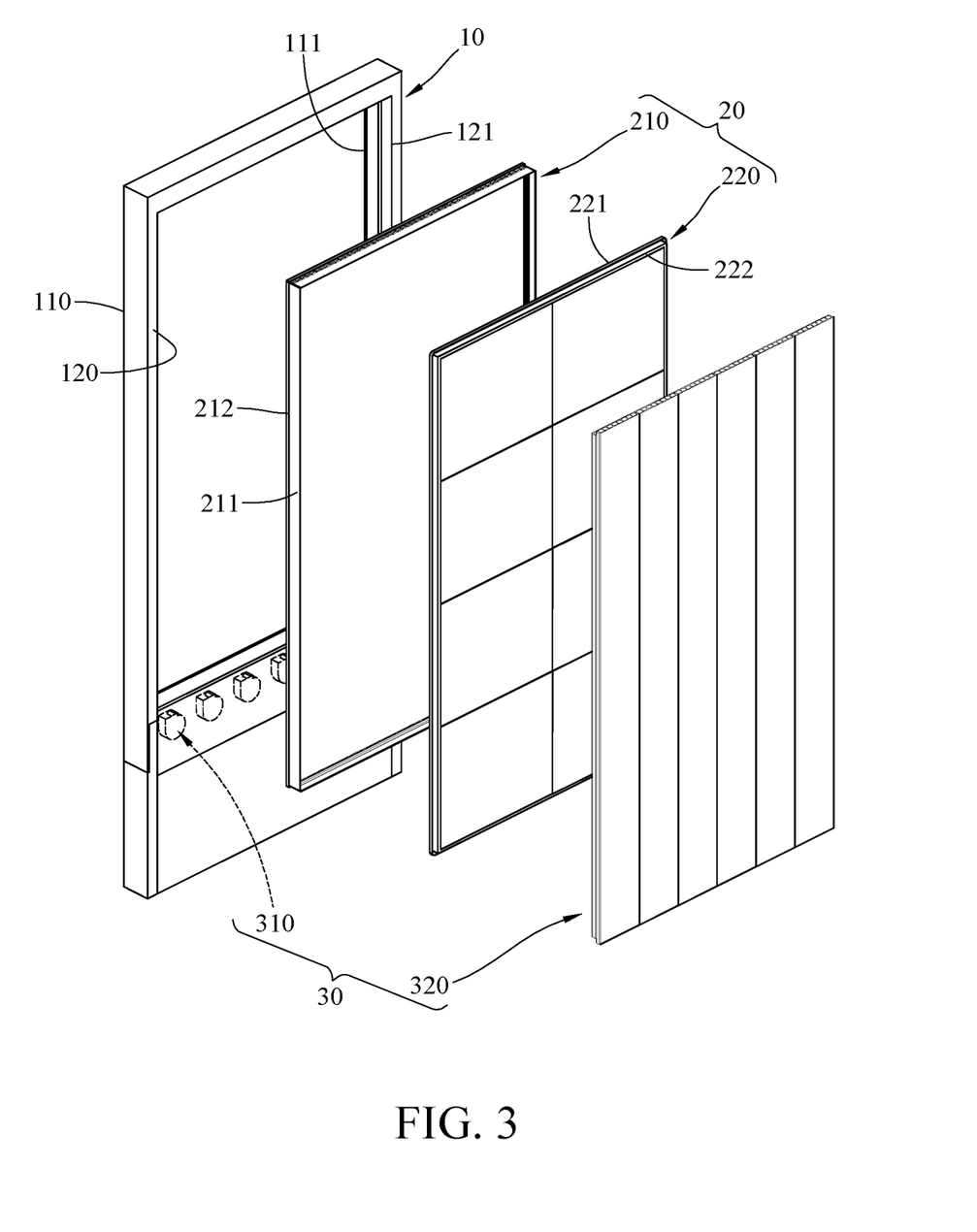
FIG. 3 is an exploded view of the display device in FIG. 2.

Please refer to FIG. 2 and FIG. 3. FIG. 2 is a perspective view of a display device according to a first embodiment of the present disclosure. FIG. 3 is an exploded view of the display device in FIG. 2. In this embodiment, a display device 1 includes a casing 10, a display assembly 20 and a heat exchanger 320. In this embodiment, the display device 1 is a direct LED.

The casing 10 includes a display portion 110 and a rear portion 120 opposite to each other. The display portion 110 has a displaying opening 111, and the rear portion 120 has a mounting opening 121. The casing 10 further has an accommodation space 130 connected with the displaying opening 111 and the mounting opening 121.

The display assembly 20 is disposed in the accommodation space 130 of the casing 10. The display assembly 20 includes a display unit 210 and a backlight module 220. The display unit 210 includes a liquid cell layer 211 and a cover glass 212. The cover glass 212 is disposed in the displaying opening 111 of the display portion 110 of the casing 10, and the liquid cell layer 211 is exposed to outside by the displaying opening 111. The backlight module 220 includes an optical film 221 and a light source 222, and the optical film 221 may include diffuser film, brightness enhancement film or the like. Moreover, the display assembly 20 further includes a chamber 230 between the display unit 210 and the backlight module 220, and the chamber 230 has an assembly space 231. The assembly space 231 is connected with the accommodation space 130 of the casing 10.

Figure 4:
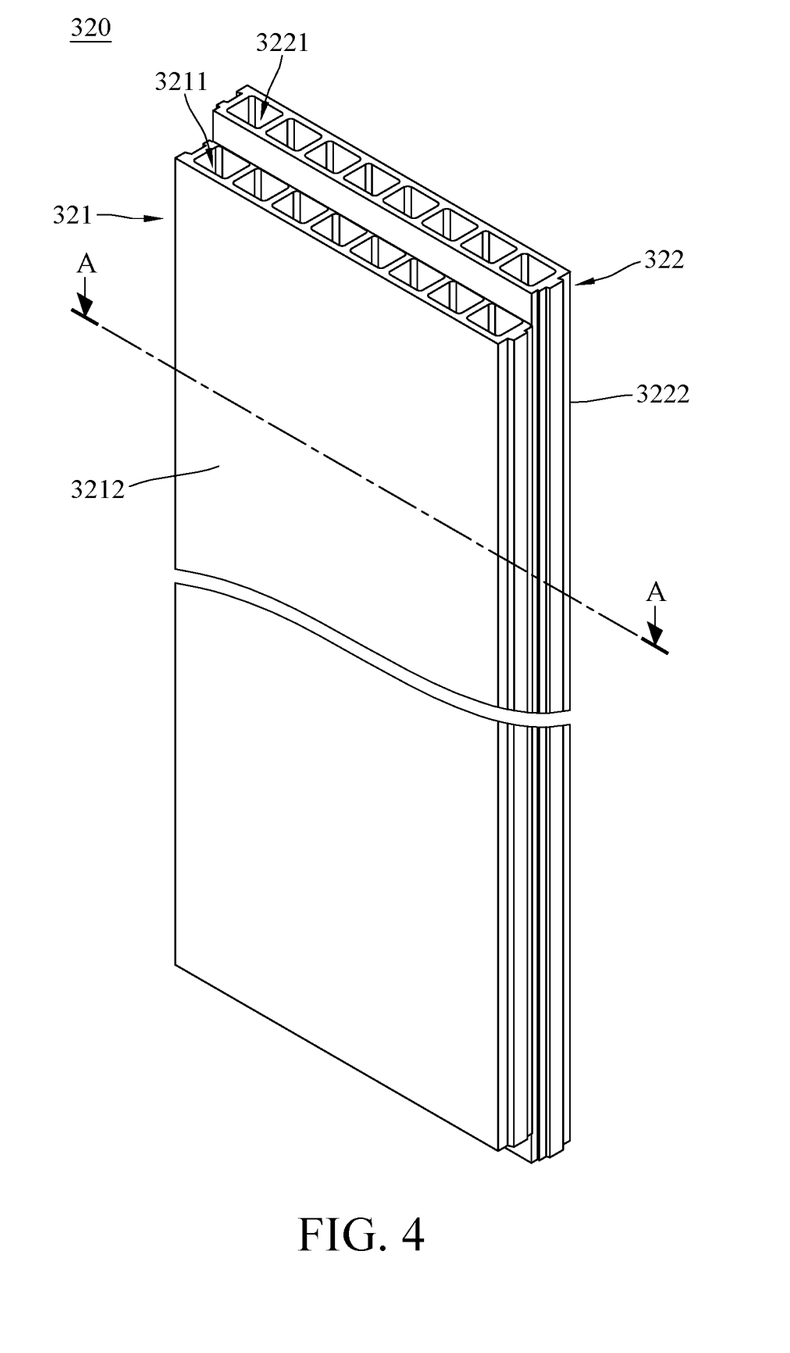
FIG. 4 is a perspective view of a heat exchanger of the display device in FIG. 3.
Figure 5:
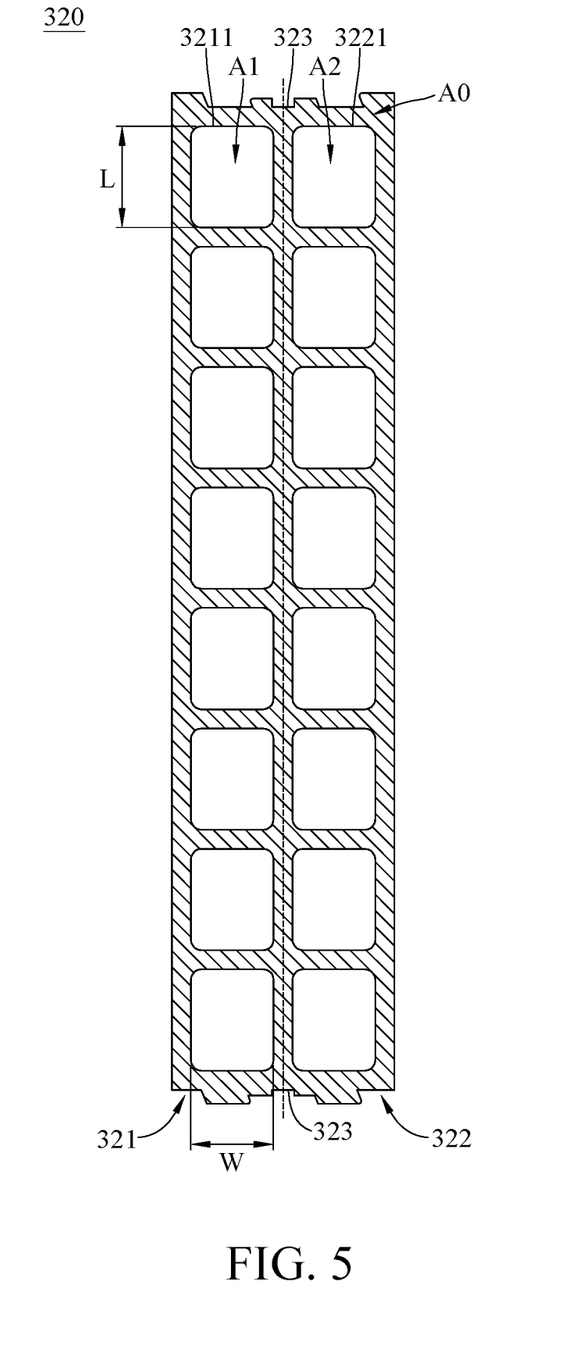
FIG. 5 is a cross sectional view of the heat exchanger in FIG. 4 along line A-A.
Figure 6:
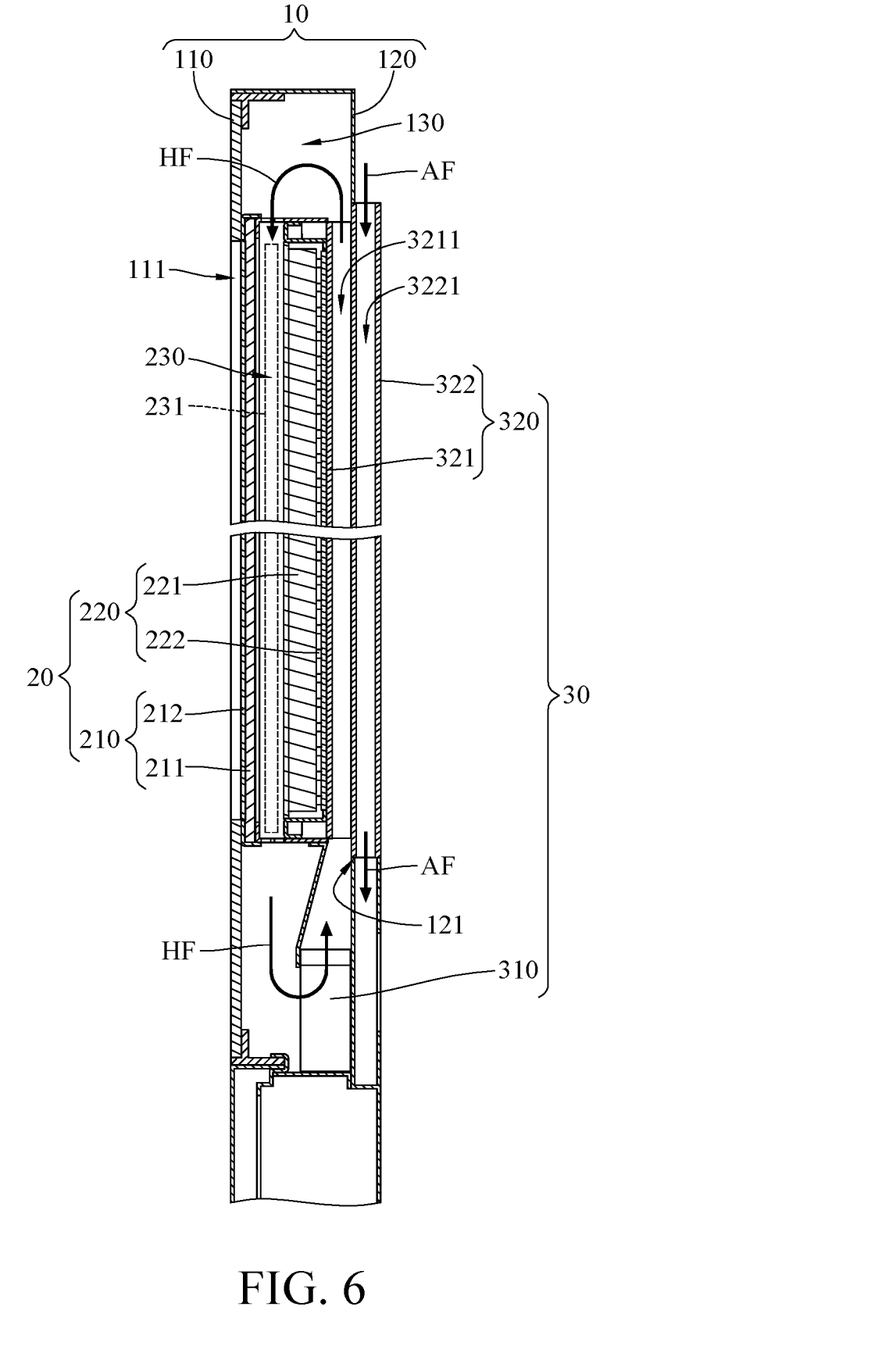
FIG. 6 is a cross sectional view of the display device in FIG. 2.

The heat exchanger 320 is disposed on the casing 10. Please further refer to FIG. 4 through FIG. 6. FIG. 4 is a perspective view of a heat exchanger of the display device in FIG. 3. FIG. 5 is a cross sectional view of the heat exchanger in FIG. 4 along line A-A. FIG. 6 is a cross sectional view of the display device in FIG. 2.

The display device 1 further includes multiple flow generators 310. The flow generators 310, for example, are fans disposed in the accommodation space 130 of the casing 10 and configured to generate gas flow in the accommodation space 130. It is worth noting that the number of the flow generator 310 is not limited in view of embodiments in the present disclosure.

The heat exchanger 320, for example, is a metal plate made of aluminum. The heat exchanger 320 includes an internal heat exchange portion 321 and an external heat exchange portion 322 which are connected and in thermal contact with each other. The internal heat exchange portion 321 has multiple internal heat dissipation channels 3211, and the external heat exchange portion 322 has multiple external heat dissipation channels 3221. The internal heat dissipation channels 3211 of the internal heat exchange portion 321 are non-connected with the external heat dissipation channels 3221 of the external heat exchange portion 322; in other words, in view of a cross section A0 of the heat exchanger 320 (a cross section of the heat exchanger 320 along line A-A in FIG. 4), the internal heat dissipation channels 3211 are spaced apart from the external heat dissipation channels 3221, such that any gas in the internal heat dissipation channels 3211 is unable to flow into the external heat dissipation channels 3221. The internal heat exchange portion 321 further has an inner side surface 3212 facing toward the display assembly 20, and the external heat exchange portion 322 further has an outer side surface 3222 opposite to the inner side surface 3212. Both the internal heat dissipation channel 3211 and the external heat dissipation channel 3221 are located between the inner side surface 3212 and the outer side surface 3222. It is worth noting that numbers of the internal heat dissipation channel 3211 and the external heat dissipation channel 3221 are not limited in view of embodiments in the present disclosure.

The heat exchanger 320 is disposed in the mounting opening 121 of the rear portion 120 of the casing 10. In detail, the heat exchanger 320 further includes an assembling structure 323 located between the internal heat exchange portion 321 and the external heat exchange portion 322. As shown in FIG. 5, the internal heat dissipation channel 3211 and the external heat dissipation channel 3221 are arranged at opposite two sides of a reference line, respectively, and the reference line passes across the assembling structure 323. In this embodiment, the assembling structure 323 is groove in which a seal ring (not shown in the drawings) may be accommodated, and the heat exchanger 320 is mounted in the mounting opening 121 by the interference fit between the seal ring and edge of the mounting opening 121. In another embodiment, the heat exchanger is adhered to the mounting opening by adhesive stuffed in the assembling structure. In yet another embodiment, the assembling structure is a hook corresponding to a slot formed on edge of the mounting opening.

The internal heat exchange portion 321 is disposed in the accommodation space 130, and the light source 222 of the backlight module 220 of the display assembly 20 is adjacently attached to the inner side surface 3212 of the internal heat exchange portion 321 so as to be in thermal contact with the internal heat exchange portion 321. In other words, the backlight module 220 is disposed between the display unit 210 and the heat exchanger 320. The internal heat dissipation channels 3211 are connected with the accommodation space 130, such that the gas flow generated by the flow generators 310 in the casing 10 is enabled to pass through the internal heat dissipation channels 3211. The external heat exchange portion 322 protrudes out of the rear portion 120 from the mounting opening 121, and the external heat dissipation channels 3221 are connected with outside. In this embodiment, since the casing 10 insulates the internal heat dissipation channels 3211 from outside and a non-connection is provided between the internal heat dissipation channels 3211 and the external heat dissipation channels 3221, the ambient air flow AF is unable to flow into the internal heat dissipation channels 3211, and the gas flow in the casing 10 is unable to flow into the external heat dissipation channels 3221.

The heat exchanger 320 according to this embodiment is favorable for dissipating heat from the display assembly 20 so as to reduce the temperature of the display assembly 20. Heat accumulated in the display assembly 20 mainly comes from two ways; one way is heat generated by the display assembly 20 under sunlight exposure, and the other way is heat generated by the light source 222 of the backlight module 220. As shown in FIG. 6, the flow generators 310 generate gas flow in the accommodation space 130 of the casing 10 in order to bring heat generated by the display assembly 20 away from the backlight module 220 via the chamber 230, wherein the chamber 230 is located between the display unit 210 and the backlight module 220, especially between the liquid cell of the display unit 210 and the optical film 221 of the backlight module 220. In detail, heat generated by the sunlight incident on the display unit 210 transferred to the chamber 230. By a characteristic of heat transfer from high temperature to low temperature during heat exchange or force of the flow generators 310, the high temperature gas flow HF moves from the chamber 230 to the internal heat dissipation channels 3211 of the internal heat exchange portion 321 through the accommodation space 130, thereby achieving circulating flow. Due to the connection between the internal heat dissipation channels 3211 and the inside of the display assembly 20, the high temperature gas flow HF caused by sunlight flows among the chamber 230 of the display assembly 20 and the internal heat dissipation channels 3211.

The ambient air AF (such as cold air) flows in the external heat dissipation channels 3221 of the external heat exchange portion 322. The high temperature gas flow HF in the internal heat dissipation channels 3211 raises the temperature of the internal heat exchange portion 321, and the ambient air flow AF in the external heat dissipation channels 3221 reduces the temperature of the external heat exchange portion 322. Therefore, due to the thermal contact between the internal heat exchange portion 321 and the external heat exchange portion 322, heat generated by the display unit 210 and the backlight module 220 of the display assembly 20 is transferred to outside through the heat exchanger 320, thereby reduce the temperature of the display assembly 20.

It is noted that heat generated by the sunlight incident on the display assembly 20 or the light source 222 of the backlight module 220 is accumulated in the display assembly 20. The display assembly 20 may include a polarizer (not shown in the drawings), a color filter (not shown in the drawings), an alignment film (not shown in the drawings), the liquid cell layer 211, an optical film (not shown in the drawings) or the like. The heat exchanger 320 is mainly configured to dissipate heat accumulated in the component(s) of the display assembly 20.

In this embodiment, the heat exchanger 320 equipped with the flow generators 310 is used for heat dissipation of the display assembly 20 so as to reduce the temperature of the display assembly 20. However, a device which the heat exchanger 320 is applied to for heat dissipation is not limited in view of embodiments in the present disclosure.

Results of heat dissipation in the display device of the first embodiment and a conventional display device are illustrated in the following Table I. With a backlight module having same light source power and a casing made of same material, the conventional display device shows higher liquid crystal temperature than the display device disclosed in the first embodiment during operation, which indicates that the heat exchanger of the present disclosure helps to dissipate heat from the components of the display device.

TABLE I

|  | Conventional display device | Display device of the first embodiment |
|---|---|---|
| Liquid crystal temperature(° C.) | 95.4 | 70.7 |

As shown in FIG. 2 and FIG. 3, in this embodiment, the size of internal heat exchange portion 321 of the heat exchanger 320 matches the size of mounting opening 121, such that any gap between the heat exchanger 320 and edge of the mounting opening 121 is prevented. The heat exchanger 320 is disposed in the mounting opening 121, for example, in embedded manner or adhesive manner. Thus, with working with the non-connected design between the internal heat dissipation channel 3211 and the external heat dissipation channel 3221, it is favorable for preventing moisture and dust existed in the external environment from entering into the casing 10, and thus the display device 1 is suitable for outdoor use. In some other embodiments, both the sizes of internal heat exchange portion 321 and external heat exchange portion 322 can match the size of mounting opening 121.

Furthermore, in this embodiment, a cross sectional area A1 of each internal heat dissipation channel 3211 of the internal heat exchange portion 321 and a cross sectional area A2 of each external heat dissipation channel 3221 of the external heat exchange portion 322 are both rectangular. As shown in FIG. 5, in view of a cross section A0 of the heat exchanger 320, cross sections of each internal heat dissipation channel 3211 and each external heat dissipation channel 3221 are the aforementioned cross sectional areas. As to the cross sectional area A1 of each internal heat dissipation channel 3211 and the cross sectional area A2 of each external heat dissipation channel 3221, the aspect ratio (ratio of length to width) is from 1:1 to 3:1. In this embodiment, each of the cross sectional areas A1 and A2 is a rectangular cross section with length L equal to 18.5 millimeters (mm) and width W equal to 15 mm. Thus, it is favorable for preventing negative influence on the compactness of the display device 1 due to overly thick heat exchanger 320. It is worth noting that shapes of the cross sectional areas A1 and A2 are not limited in view of embodiments in the present disclosure.

Moreover, in this embodiment, the heat exchanger 320 is an integrated single piece. Thus, it is favorable for an easier manufacturing of the heat exchanger 320 so as to reduce cost and ensure a proper thermal contact between the internal heat exchange portion 321 and the external heat exchange portion 322. It is noted that an integrated heat exchanger 320 is not limited in view of embodiments in the present disclosure. In some other embodiments, the internal heat exchange portion and the external heat exchange portion are separated components which are assembled together to obtain the heat exchanger.

As shown in FIG. 5, a sum of cross sectional areas A1 of all internal heat dissipation channels 3211 and cross sectional areas A2 of all external heat dissipation channels 3221 (that is, the total of cross section areas A1 and cross sectional areas A2) is 35% to 70% of the cross section A0 of the heat exchanger 320 (that is, a sum of cross sectional area of the internal heat exchange portion 321 and cross sectional area of the external heat exchange portion 322). Preferably, a sum of cross sectional areas A1 and cross sectional areas A2 is 37% to 62% of the cross section A0. Thus, sizes of the internal heat dissipation channel 3211 and the external heat dissipation channel 3221 is proper for sufficient flow rate, and the heat dissipation area on inner walls inside the internal heat dissipation channel 3211 and the external heat dissipation channel 3221 is favorable for providing better thermal contact between the air flow and the heat exchanger 320. In FIG. 5, the sum of all cross sectional areas A1 and all cross sectional areas A2 (sum=(A1×8)+(A2×8)) is 62% of the cross section A0.

Figure 7:
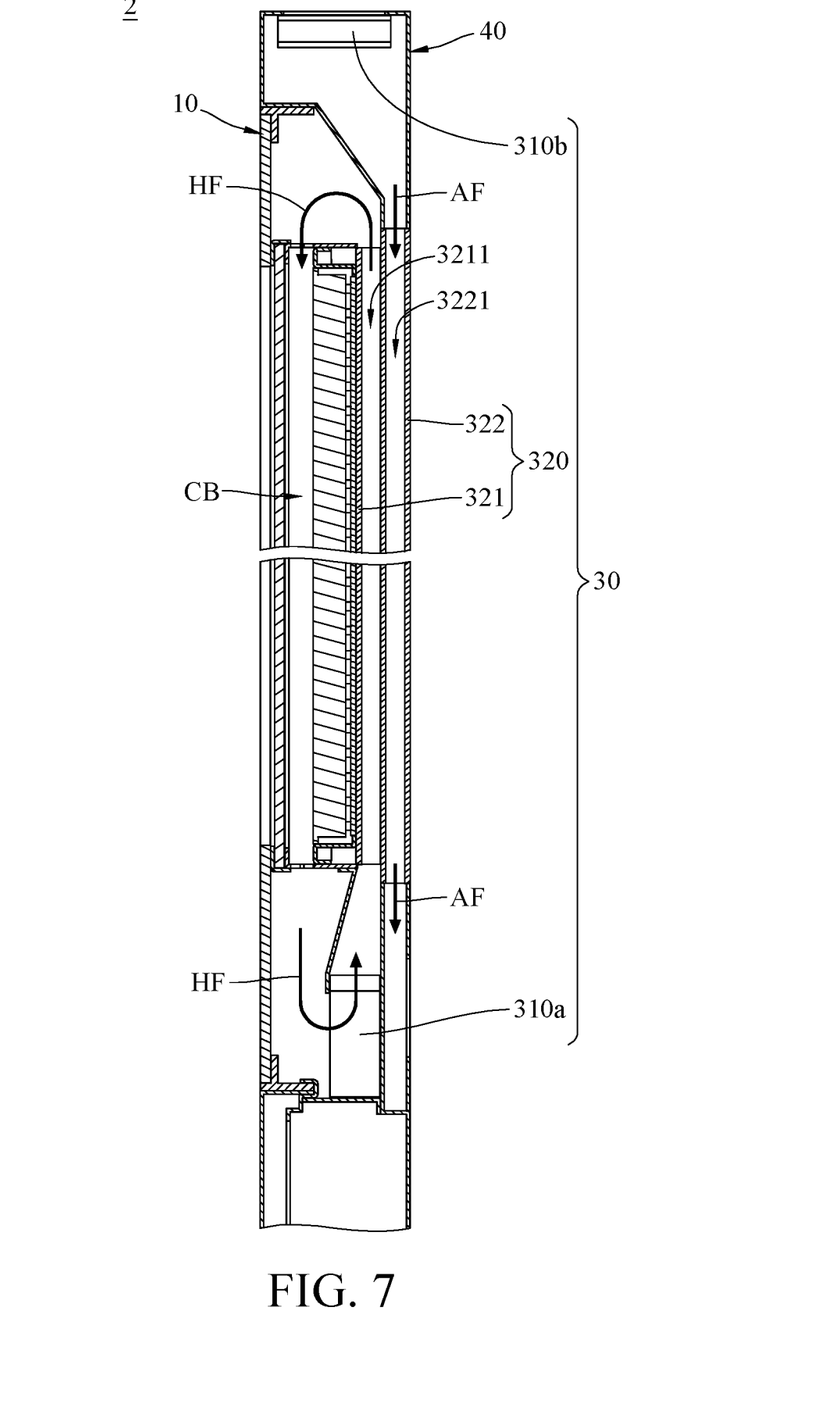
FIG. 7 is a cross sectional view of a display device according to a second embodiment of the present disclosure.

FIG. 7 is a cross sectional view of a display device according to a second embodiment of the present disclosure. Since the second embodiment is similar to the first embodiment, only differences will be described hereafter.

In this embodiment, a display device 2 further includes a cover 40 disposed on the casing 10, multiple first flow generators 310a (referred to the flow generators 310 in the first embodiment) and multiple second flow generators 310b. The first flow generators 310a are disposed in the casing 10. The second flow generators 310b is disposed on the cover 40, and the second flow generators 310b correspond to the external heat dissipation channels 3221 of the external heat exchange portion 322. The first flow generator 310a is configured to bring the high temperature gas flow HF in the casing 10 into the internal heat dissipation channels 3211 of the internal heat exchange portion 321. The second flow generator 310b is configured to bring ambient air flow AF into the external heat dissipation channels 3221 of the external heat exchange portion 322.

Since the second flow generator 310b forces air movement to create ambient air flow AF, it is favorable for enhancing heat exchange efficiency between the internal heat exchange portion 321 and the external heat exchange portion 322. Also, since the cover 40 covers the external heat exchange portion 322 protruding from the casing 10, it is favorable for an attractive appearance of the display device 2.

Figure 8:
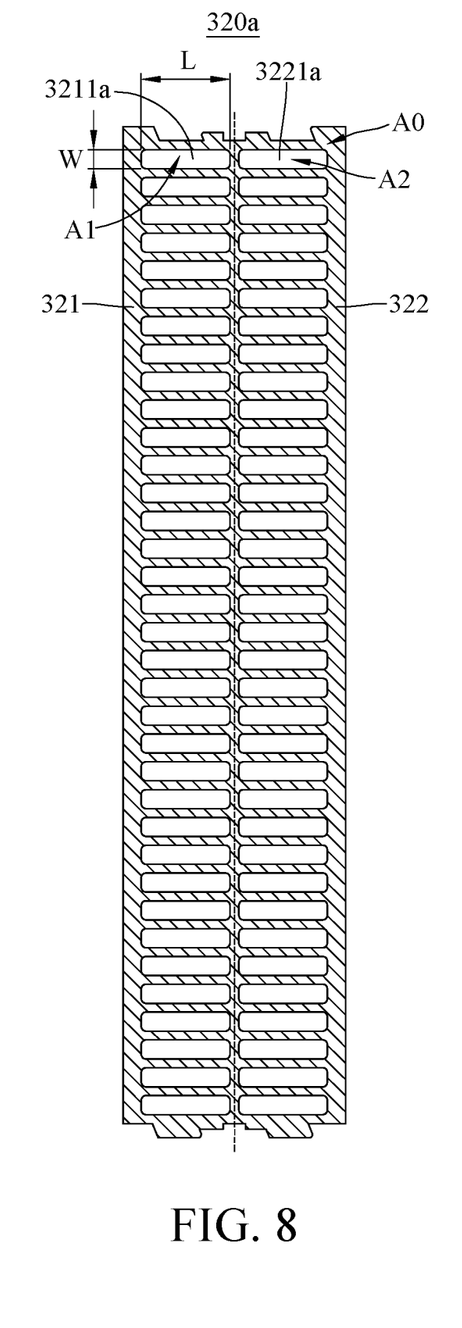
FIG. 8 is a cross sectional view of a heat exchanger for display device according to a third embodiment of the present disclosure.

FIG. 8 is a cross sectional view of a heat exchanger for display device according to a third embodiment of the present disclosure. Since the third embodiment is similar to the first embodiment, only differences will be described hereafter.

In this embodiment, each internal heat dissipation channel 3211a and each external heat dissipation channel 3221a of the heat exchanger 320a has a rectangular cross sectional area with the length L equal to 35 mm and the width W equal to 7.5 mm. The sum of all cross sectional areas A1 and all cross sectional areas A2 is 58% of the cross section A0 of the heat exchanger 320a.

Results of heat dissipation in a display device including the heat exchanger of the third embodiment and the display device of the first embodiment are illustrated in the following Table II. The display device including the heat exchanger of the third embodiment shows higher liquid crystal temperature and higher light source temperature than the display device disclosed in the first embodiment during operation.

TABLE II

|  | Display device of the first embodiment | Display device including heat exchanger of the third embodiment |
| --- | --- | --- |
| Liquid crystal temperature(° C.) | 70.7 | 82 |
| Light source temperature(° C.) | 69 | 70 |

Figure 9:
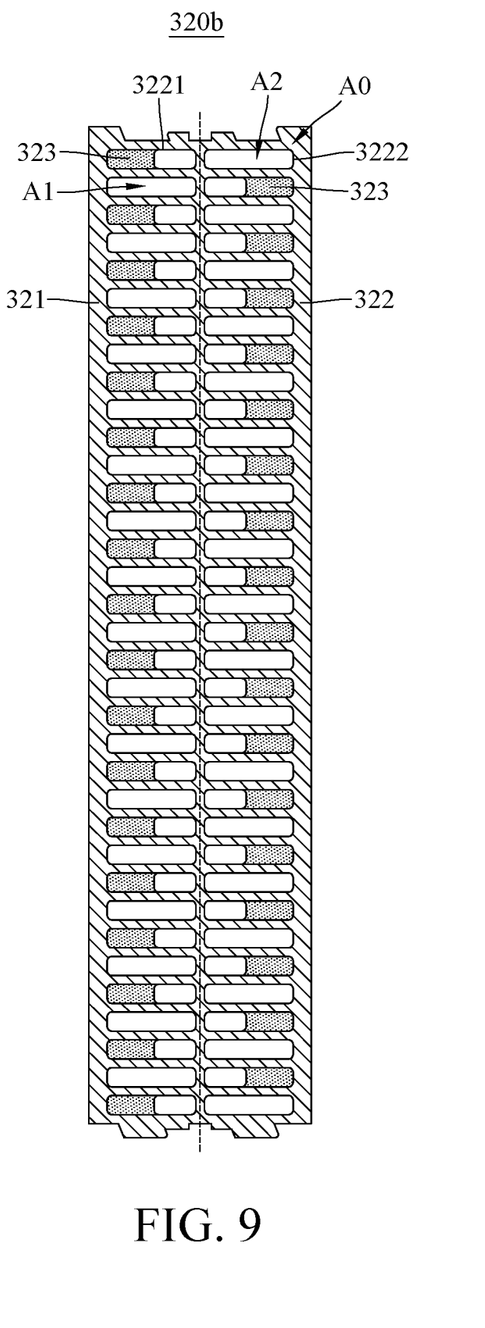
FIG. 9 is a cross sectional view of a heat exchanger for display device according to a fourth embodiment of the present disclosure.

FIG. 9 is a cross sectional view of a heat exchanger for display device according to a fourth embodiment of the present disclosure. Since the fourth embodiment is similar to the first embodiment, only differences will be described hereafter.

In this embodiment, the heat exchanger 320b further includes multiple heat sink fins F1. The heat sink fins F1 are respectively disposed in some of the internal heat dissipation channels 3211 of the internal heat exchange portion 321 and some of the external heat dissipation channels 3221 of the external heat exchange portion 322. Thus, it is favorable for increasing the surface area for heat dissipation in the internal heat dissipation channels 3211 and the external heat dissipation channels 3221.

Furthermore, in this embodiment, the sum of all cross sectional areas A1 and all cross sectional areas A2 is 37% of the cross section A0 of the heat exchanger 320b.

Results of heat dissipation in a display device including the heat exchanger of the fourth embodiment and the display device of the first embodiment are illustrated in the following Table III. The display device including the heat exchanger of the fourth embodiment shows higher liquid crystal temperature and higher light source temperature than the display device disclosed in the first embodiment during operation.

TABLE III

|  | Display device of the first embodiment | Display device including heat exchanger of the fourth embodiment |
| --- | --- | --- |
| Liquid crystal temperature(° C.) | 70.7 | 73.6 |
| Light source temperature(° C.) | 69 | 72 |

Figure 10:
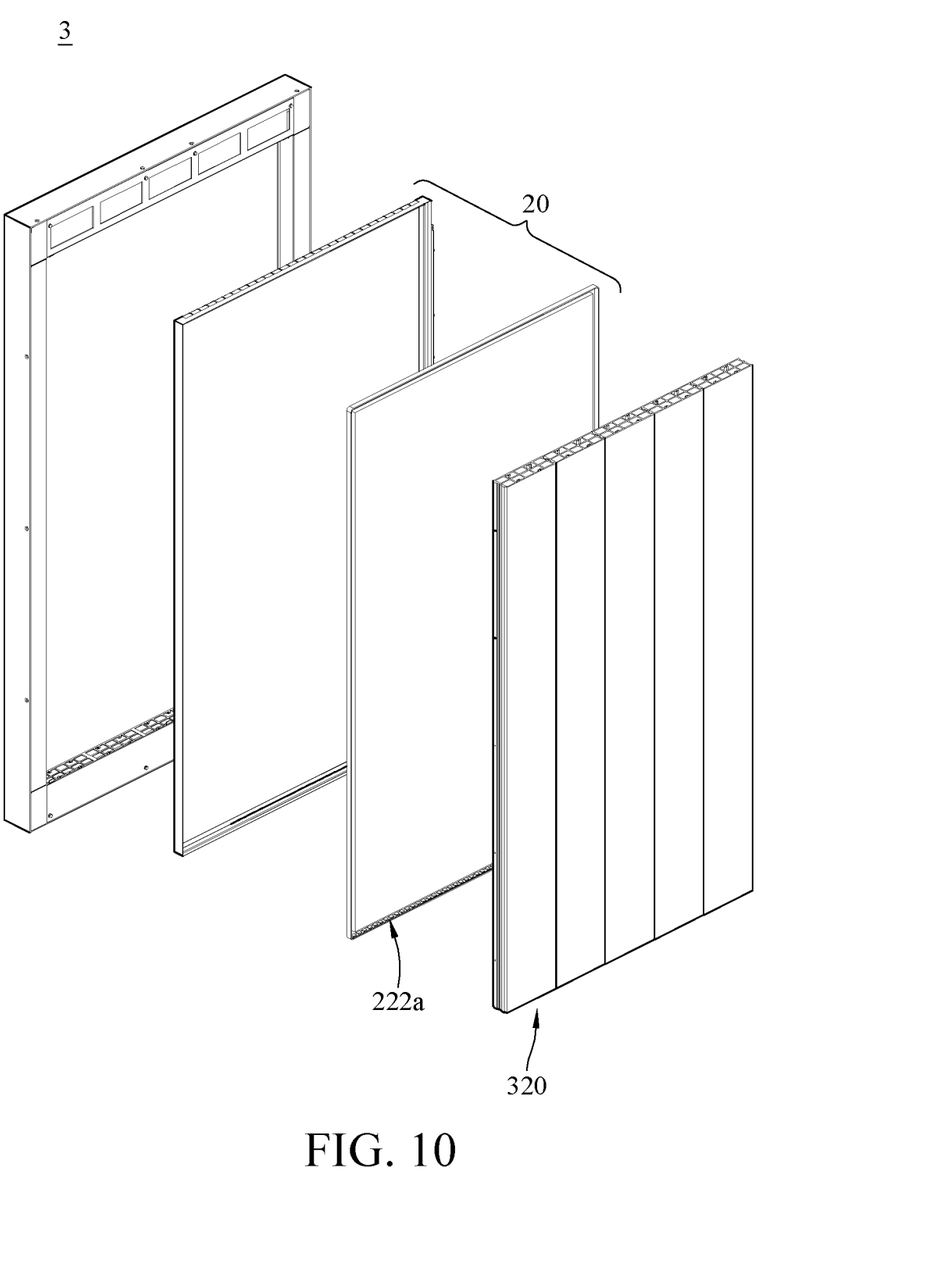
FIG. 10 is an exploded view of the display device according to a fifth embodiment of the present disclosure.
Figure 11:
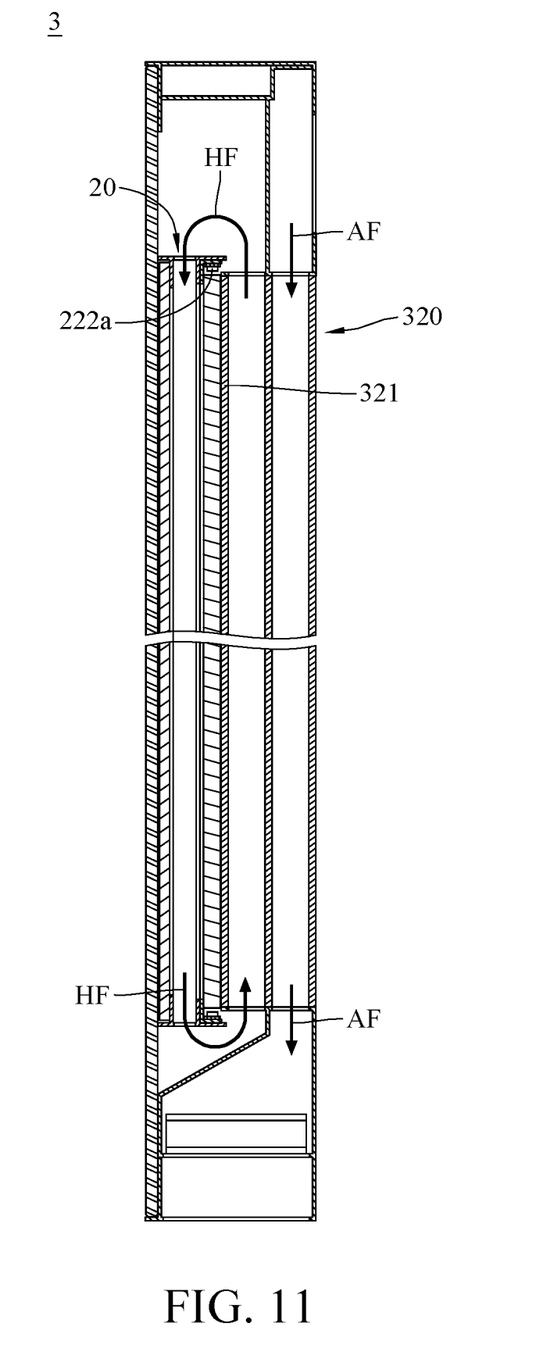
FIG. 11 is a cross sectional view of the display device in FIG. 10.

FIG. 10 is an exploded view of the display device according to a fifth embodiment of the present disclosure. FIG. 11 is a cross sectional view of the display device in FIG. 10. Since the fifth embodiment is similar to the first embodiment, only differences will be described hereafter.

In this embodiment, a display device 3 is an edge LED. In detail, the display assembly 20 of the display device 3 includes a light source 222a, and the light source 222a is positioned to be adjacent to the internal heat exchange portion 321 of the heat exchanger 320.

According to the disclosure, the heat exchanger includes the internal heat exchange portion and the external heat exchange portion. The flow generator brings the high temperature gas flow in the casing to the internal heat dissipation channel of the internal heat exchange portion. The ambient air flow in the external environment passes through the external heat dissipation channel of the external heat exchange portion. Due to heat exchange between the internal heat dissipation channel and the external heat dissipation channel, heat generated by the backlight module is transferred to outside via the heat exchanger, thereby reducing the temperature of the display device.

Moreover, the design of non-connection between the internal heat dissipation channel and the external heat dissipation channel is favorable for preventing moisture and dust existed in the external environment from entering into the casing, and thus the display device is suitable for outdoor use.

The foregoing description, for the purpose of explanation, has been described with reference to specific embodiments; however, the embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

What is claimed is:

1. A heat exchanger for an electronic device comprising a light module, the heat exchanger comprising:
    an internal heat exchange portion configured to be adjacently attached to the light module, the internal heat exchange portion having at least one internal heat dissipation channel, the at least one internal heat dissipation channel being connected with a device space of the electronic device, wherein a high temperature gas flow generated by the light module is enabled to pass through the device space and the at least one internal heat dissipation channel;
    an external heat exchange portion in thermal contact with the internal heat exchange portion, the external heat exchange portion having an external heat dissipation structure non-connected with the at least one internal heat dissipation channel, the at least one internal heat dissipation channel is provided entirely between the at least one external heat dissipation structure and the light module; and a flow generator corresponding to the external heat dissipation structure.

2. The heat exchanger according to claim 1, wherein an ambient air flow is enabled to pass through the external heat dissipation structure.

3. The heat exchanger according to claim 2, wherein the external heat dissipation structure has at least one external heat dissipation channel, and the ambient air flow is enabled to pass through the at least one external heat dissipation channel.

4. The heat exchanger according to claim 3, wherein both a number of the at least one internal heat dissipation channel and a number of the at least one external heat dissipation channel are multiple.

5. The heat exchanger according to claim 4, wherein a sum of cross sectional areas of the internal heat dissipation channels and the external heat dissipation channels is 35% to 70% of a sum of cross sectional areas of the internal heat exchange portion and the external heat exchange portion.

6. The heat exchanger according to claim 3, wherein the internal heat exchange portion further has an inner side surface facing toward the light module, the external heat exchange portion further has an outer side surface opposite to the inner side surface, the at least one internal heat dissipation channel and the at least one external heat dissipation channel are located between the inner side surface and the outer side surface.

7. The heat exchanger according to claim 3, further comprising a plurality of heat sink fins disposed in at least one of the at least one internal heat dissipation channel and the at least one external heat dissipation channel.

8. The heat exchanger according to claim 2, wherein the external heat dissipation structure comprises a plurality of heat sink fins, and the ambient air flow is enabled to pass through the plurality of heat sink fins.

9. A display device, comprising:
a casing comprising a display portion and a rear portion opposite to each other;
a first flow generator disposed in the casing;
a cover disposed on the casing;
a second flow generator disposed on the cover;
a display assembly comprising a display unit and a backlight module, wherein the display unit is exposed to outside by the display portion; and
a heat exchanger disposed on the rear portion of the casing, the heat exchanger comprising:
an internal heat exchange portion configured to be adjacently attached to the backlight module of the display assembly, the backlight module being in thermal contact with the internal heat exchange portion, the internal heat exchange portion having at least one internal heat dissipation channel, the at least one internal heat dissipation channel being connected with an assembly space of the display assembly, wherein the first flow generator corresponds to the at least one internal heat dissipation channel, and a high temperature gas flow generated by the display assembly is enabled to pass through the assembly space and the at least one internal heat dissipation channel; and
an external heat exchange portion in thermal contact with the internal heat exchange portion, the external heat exchange portion having an external heat dissipation structure non-connected with the at least one internal heat dissipation channel, the at least one internal heat dissipation channel is provided entirely between the at least one external heat dissipation structure and the backlight module, and the second flow generator corresponds to the external heat dissipation structure.

10. The display device according to claim 9, wherein an ambient air flow is enabled to pass through the external heat dissipation structure.

11. The display device according to claim 10, wherein the external heat dissipation structure has at least one external heat dissipation channel, and the ambient air flow is enabled to pass through the at least one external heat dissipation channel.

12. The display device according to claim 11, wherein both a number of the at least one internal heat dissipation channel and a number of the at least one external heat dissipation channel are multiple.

13. The display device according to claim 12, wherein a sum of cross sectional areas of the internal heat dissipation channels and the external heat dissipation channels is 35% to 70% of a sum of cross sectional areas of the internal heat exchange portion and the external heat exchange portion.

14. The display device according to claim 11, wherein the internal heat exchange portion further has an inner side surface facing toward the display assembly, the external heat exchange portion further has an outer side surface opposite to the inner side surface, the at least one internal heat dissipation channel and the at least one external heat dissipation channel are located between the inner side surface and the outer side surface.

15. The display device according to claim 11, further comprising a plurality of heat sink fins disposed in at least one of the at least one internal heat dissipation channel and the at least one external heat dissipation channel.

16. The display device according to claim 10, wherein the external heat dissipation structure comprises a plurality of heat sink fins, and the ambient air flow is enabled to pass through the plurality of heat sink fins.

17. The display device according to claim 9, wherein the display assembly further comprises a chamber, the chamber is located between the display unit and the backlight module, and the chamber has the assembly space.

* * * * *